United States Patent
Liao et al.

(10) Patent No.: US 12,444,475 B2
(45) Date of Patent: Oct. 14, 2025

(54) REDUCING READ ERROR HANDLING OPERATIONS DURING POWER UP OF A MEMORY DEVICE

(71) Applicant: Micron Technology, Inc., Boise, ID (US)

(72) Inventors: Dongxiang Liao, Cupertino, CA (US); Tomer Tzvi Eliash, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/431,279

(22) Filed: Feb. 2, 2024

(65) Prior Publication Data

US 2024/0290413 A1 Aug. 29, 2024

Related U.S. Application Data

(60) Provisional application No. 63/486,856, filed on Feb. 24, 2023.

(51) Int. Cl.
*G11C 29/44* (2006.01)
*G11C 16/28* (2006.01)

(52) U.S. Cl.
CPC .............. *G11C 29/44* (2013.01); *G11C 16/28* (2013.01)

(58) Field of Classification Search
None
See application file for complete search history.

(56) References Cited

U.S. PATENT DOCUMENTS

| | | | |
|---|---|---|---|
| 6,158,000 A * | 12/2000 | Collins | G06F 9/4405 713/1 |
| 9,594,611 B2 * | 3/2017 | Hashimoto | G06F 11/1417 |
| 2015/0089293 A1 * | 3/2015 | Waechter | G06F 11/1417 714/36 |
| 2020/0210587 A1 * | 7/2020 | Shi | G11C 29/24 |
| 2021/0373908 A1 * | 12/2021 | Liang | G06F 9/4403 |

* cited by examiner

*Primary Examiner* — Daniel F. McMahon
(74) *Attorney, Agent, or Firm* — Lowenstein Sandler LLP

(57) ABSTRACT

A boot-up read pattern data structure is maintained. Each entry of the boot-up read pattern data structure comprises a boot-up read pattern associated with a respective power cycle event and a dummy boot-up read pattern flag. The dummy boot-up read pattern flag indicates that the boot-up read pattern has been consecutively used during boot-up. Storing, in a new entry of the boot-up read pattern data structure, a current boot-up read pattern associated with a respective power cycle event for each power cycle event. The current boot-up read pattern with a previous boot-up read pattern associated with a latest entry of the boot-up pattern data structure is compared. A dummy boot-up read pattern flag of the new entry is updated responsive to the comparing the current boot-up read pattern and the previous boot-up read pattern.

20 Claims, 4 Drawing Sheets

| Power Cycle Event | Boot-up Read Pattern 220 | | | | | | Dummy Boot-up Pattern Flag |
|---|---|---|---|---|---|---|---|
| 210A | OS LBA | OS LBA | OS LBA | ... | APP LBA | APP LBA | 230A |
| 210B | OS LBA | OS LBA | OS LBA | ... | APP LBA | APP LBA | 230B |
| 210C | OS LBA | OS LBA | OS LBA | ... | APP LBA | APP LBA | 230C |
| 210D | OS LBA | OS LBA | OS LBA | ... | APP LBA | APP LBA | 230D |
| 210E | OS LBA | OS LBA | OS LBA | ... | APP LBA | APP LBA | 230E |
| 210F | OS LBA | OS LBA | OS LBA | ... | APP LBA | APP LBA | 230F |
| 210G | OS LBA | OS LBA | OS LBA | ... | APP LBA | APP LBA | 230G |
| 210H | OS LBA | OS LBA | OS LBA | ... | APP LBA | APP LBA | 230H |

```
┌─────────────────────────────────────────────────────────────────┐
│ Maintain a boot-up read pattern data structure, wherein each    │
│ entry of the boot-up read pattern data structure comprises a    │
│ boot-up read pattern associated with a respective power cycle   │
│ event and a dummy boot-up read pattern flag, and wherein the    │
│ dummy boot-up read pattern flag indicates that the boot-up read │
│ pattern has been consecutively used during boot up.             │
│                            310                                  │
└─────────────────────────────────────────────────────────────────┘
                              │
                              ▼
┌─────────────────────────────────────────────────────────────────┐
│ For each power cycle event, store, in a new entry of the        │
│ boot-up read pattern data structure, a current boot-up read     │
│ pattern associated with a respective power cycle event.         │
│                            320                                  │
└─────────────────────────────────────────────────────────────────┘
                              │
                              ▼
┌─────────────────────────────────────────────────────────────────┐
│ Compare the current boot-up read pattern with a previous        │
│ boot-up read pattern associated with a latest entry of the      │
│ boot-up pattern data structure.                                 │
│                            330                                  │
└─────────────────────────────────────────────────────────────────┘
                              │
                              ▼
┌─────────────────────────────────────────────────────────────────┐
│ Responsive to the comparing the current boot-up read pattern    │
│ and the previous boot-up read pattern, update a dummy boot-up   │
│ read pattern flag of the new entry.                             │
│                            340                                  │
└─────────────────────────────────────────────────────────────────┘
                              │
                              ▼
┌─────────────────────────────────────────────────────────────────┐
│ Responsive to a subsequent power cycle event, perform a dummy   │
│ read using a boot-up read pattern associated with a latest      │
│ entry of the boot-up read pattern data structure.               │
│                            350                                  │
└─────────────────────────────────────────────────────────────────┘
```

FIG. 3

REDUCING READ ERROR HANDLING OPERATIONS DURING POWER UP OF A MEMORY DEVICE

RELATED APPLICATIONS

This application claims the benefit of U.S. Provisional Patent Application No. 63/486,856, filed Feb. 24, 2023, entitled "REDUCING READ ERROR HANDLING OPERATIONS DURING POWER UP OF A MEMORY DEVICE," which is incorporated by reference herein.

TECHNICAL FIELD

Embodiments of the disclosure relate generally to memory sub-systems, and more specifically, relate to reducing read error handling operations during power up of a memory device in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 illustrates a flow diagram of an example method of reducing read error handling operations during power up of a memory device, in accordance with some embodiments of the present disclosure.

DETAILED DESCRIPTION

Figure 1:
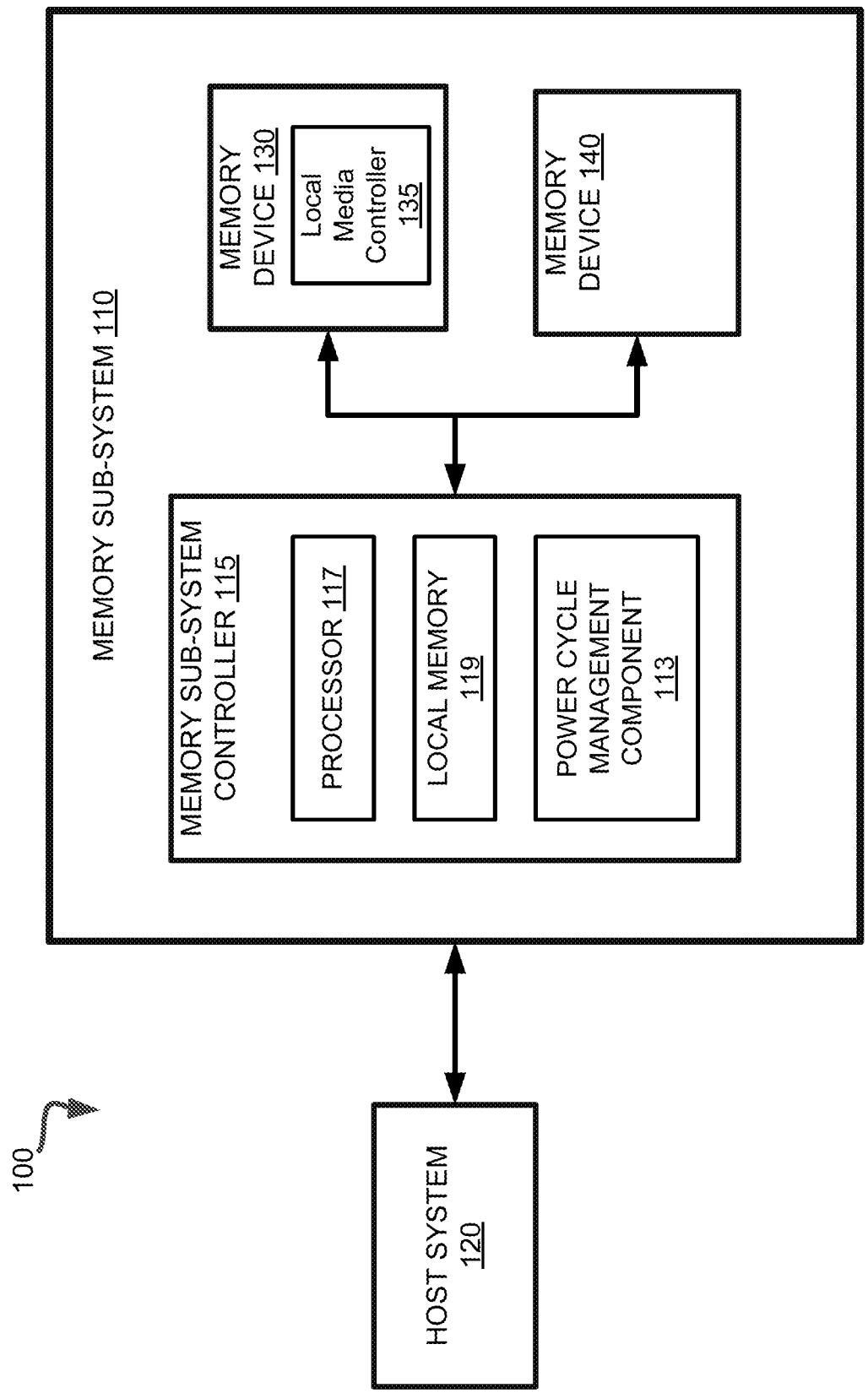
FIG. 1 illustrates an example computing system that includes a memory sub-system in accordance with some embodiments of the present disclosure.

Aspects of the present disclosure are directed to reducing read error handling operations during power up of a memory device in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can includes of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can have a row of associated memory cells in a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

The state or condition of blocks (or memory cells of the block) may change after a period of time (e.g., minutes to hours depending on a temperature of the memory sub-system). For example, the state of the memory cells, when not consistently read or maintained, gradually transitions from a transient threshold voltage ($V_t$) state (e.g., transient state) to a stable threshold voltage ($V_t$) state (e.g., transient state). The transient state can be a physical state of the memory cell where electrons of the memory cell are distributed throughout the memory cell. The stable state can be another physical state of the memory cell where the electrons of the memory cell are not distributed throughout the memory cell, and are instead distributed toward the edges or exterior of the memory cell.

Typically, memory devices are optimized for transient states. Transient states correspond to a state of the memory cell where data stored at the memory cell can be read or retrieved with a decreased error rate when compared with stable states. Stable states correspond to a state of the memory cell where the data stored at the memory cell can be read or retrieved with an increased error rate. As a result, a first read of the memory cell during the stable state, after not being consistently read or maintained, will inevitably produce a higher error rate due to the shift between the transient state to the stable state.

Some memory devices may be frequently powered down. During the period of time that the memory device is powered down, the transient state is unable to be maintained. In particular, during the period of time the memory device is powered down, the memory device is not being consistently read to maintain the transient state. Further attempts to track blocks of the memory device during the power-up have proven to be overly costly. As a result, the memory device will inevitably experience high error rates during a first page read of the block.

When a read fails, the memory sub-system enters a read error handling operation. Typically, read error handling operations cause delay during power up of the memory device. The state or condition of the block may cause further complications. For example, if the block is in a stable state, the read error handling (REH) operations may require more steps and cause additional delays during power up of the memory device. In some instances, back-to-back REH operations may occur during the power-up of the memory device, resulting in the host system timing out.

Aspects of the present disclosure address the above and other deficiencies by identifying a read pattern likely to be used during power up of the memory sub-system and proactively performing a dummy read using the identified read pattern during power up. In one embodiment, the memory sub-system maintains a boot-up read pattern data structure comprising a plurality of entries, each identified by a power cycle event (e.g., power up of a memory sub-system subsequent to a power down of the memory sub-system). In one embodiment, each entry of the plurality of entries of the data structure comprises a plurality of logical block addresses (LBAs) that were read during the power cycle event (e.g., a boot-up read pattern) and a bit flag (e.g., a dummy boot-up pattern flag).

The plurality of logical block addresses (LBAs) that were read during the power cycle event includes LBAs associated with loading an operating system (OS) and LBAs associated with loading applications. If a portion of the boot-up read pattern of a current power cycle event matches a portion of the boot-up read pattern of a previous power cycle event (e.g., the portion of the plurality of LBAs associated with loading the OS), processing logic can set the bit flag to indicate that the boot-up read pattern has been consecutively used. Otherwise, if a portion of the boot-up read pattern of a current power cycle event does not match a portion of the boot-up read pattern of a previous power cycle event, the processing logic can reset the bit flag (e.g., clear the bit flag) to indicate that the boot-up read pattern has not been consecutively used.

Accordingly, upon experiencing a subsequent power cycle event, the memory sub-system performs a dummy read prior to a host read used to load the operating system and applications of the host system. The memory sub-system may perform a dummy read using the boot-up read pattern used during the last power cycle event by obtaining the boot-up read pattern from the latest entry of the boot-up read pattern data structure. In some embodiments, the memory sub-system may traverse the boot-up read pattern data structure from the latest entry of the boot-up read pattern data structure to the first entry of the boot-up read pattern data structure to identify the latest entry with a set bit flag. The memory sub-system may perform a dummy read using the boot-up read pattern of the latest entry with a set bit flag.

Depending on the embodiment, in response to performing a read operation on a first logical block address after a power cycle event, the processing logic can initiate (or start) a timer. If a page of the first LBA fails the read operation, the processing logic can identify a data state metric (e.g., raw bit error rate) associated with the first read. The memory sub-system re-reads the page and identifies a data state metric associated with the re-read. The memory sub-system identifies a difference between the data state metric associated with the first read and the data state metric associated with the re-read (e.g., change in data state metric).

Based on the change in data state metric and a time since the timer was initiated (e.g., time passed), the memory sub-system determines whether to re-read the page. In some embodiments, the re-read of the page may occur instantly or with some delay. The delay provides additional time so that the state may transition from stable state to transient state. The memory sub-system re-reads the page if the change in data state metric exceeds a predetermined data state metric threshold and the time passed does not exceed a predetermined time threshold. The predetermined time threshold refers to a time period from the initiation of the timer in which a state transition should be completed. If the change in data state metric does not exceed the predetermined data state metric threshold and/or the time passed exceeds the predetermined time threshold, the memory sub-system proceeds to perform further REH operations.

Advantages of the present disclosure include, but are not limited to, improving memory device performance, quality of service, and reliability by reducing or avoiding REH operations during power up of the memory device. More specifically, by proactively performing a dummy read with the boot-up pattern likely to be used during power-up of the memory sub-system, it is possible to initiate the state transition of one or more memory cells from stable state to transient state. This results in the one or more memory cells being transitioned into a transient state, which eliminates the increased error rate caused by host reads to load the host's operating system and applications.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a power cycle management component 113 that proactively performs a dummy read during power up based on a read pattern likely to be used during the power up of the memory sub-system. In some embodiments, the memory sub-system controller 115 includes at least a portion of the power cycle management component 113. In some embodiments, the power cycle management component 113 is part of the host system 120, an application, or an operating system. In other embodiments, local media controller 135 includes at least a portion of power cycle management component 113 and is configured to perform the functionality described herein.

The power cycle management component 113 maintains a boot-up read pattern data structure in local memory 119. Each entry of the boot-up read pattern data structure is indexed (e.g., identified) by a power cycle event. A power cycle event refers to powering up of the memory sub-system 110 subsequent to a power down of the memory sub-system 110. Each entry of the boot-up read pattern data structure stores a boot-up read pattern and a dummy boot-up pattern flag. The boot-up read pattern refers to a plurality of logical block addresses (LBAs) that were read in response to a host read during a respective power cycle event. The plurality of LBAs of the boot-up read pattern includes LBAs associated with loading an operating system (OS) and LBAs associated with loading applications. The boot-up pattern flag if set indicates that the boot-up read pattern has been consecutively used (i.e., the boot-up read pattern was used in the previous power cycle event). Otherwise, the boot-up pattern flag if not set (or reset) indicates that the boot-up read pattern has not been consecutively used (i.e., the boot-up read pattern was not used in the previous power cycle event).

The power cycle management component 113, responsive to a current power cycle event identifies a plurality of LBAs used in a host read during the power cycle event. The power cycle management component 113 retrieves, from the boot-up read pattern data structure, the boot-up read pattern from the latest entry of the boot-up read pattern data structure (e.g., a previous power cycle event). The power cycle management component 113 compares the plurality of LBAs of the current power cycle event with the plurality of LBAs associated with the boot-up read pattern of the previous power cycle event.

The power cycle management component 113 appends, to the boot-up read pattern data structure, an entry identifiable by the current power cycle event. The power cycle management component 113 stores in the newly appended entry the plurality of LBAs of the current power cycle event and sets the dummy boot-up pattern flag according to the comparison. In particular, if a subset of the plurality of LBAs of the current power cycle event associated with loading the OS matches a subset of the plurality of the previous power cycle event associated with loading the OS, the power cycle management component 113 sets the dummy boot-up pattern flag. Otherwise, if the subset of the plurality of LBAs of the current power cycle event associated with loading the OS does not match the subset of the plurality of the previous power cycle event associated with loading the OS, the power cycle management component 113 does not set (or resets) the dummy boot-up pattern flag.

During each power cycle event, the power cycle management component 113 performs a dummy read prior to the host performing a read (e.g., a host read). The power cycle management component 113 performs the dummy read using a boot-up read pattern from the boot-up read pattern data structure. Depending on the embodiment, the power cycle management component 113 may perform the dummy read on the plurality of LBAs associated with the boot-up read pattern or a subset of the plurality of LBAs associated with the boot-up read pattern.

In some embodiments, the power cycle management component 113 may select the boot-up read pattern from the boot-up read pattern data structure based on the latest entry of the boot-up read pattern data structure irrespective of the dummy boot-up pattern flag. In some embodiments, the power cycle management component 113 may select the boot-up read pattern from the boot-up read pattern data structure based on the latest entry of the boot-up read pattern data structure with the dummy boot-up pattern flag set. The power cycle management component 113 may determine the latest entry of the boot-up read pattern data structure with the dummy boot-up pattern flag set by traversing the boot-up read pattern data structure from the latest entry of the boot-up read pattern data structure to the first entry of the boot-up read pattern data structure to identify the first entry with a set the dummy boot-up pattern flag. Thus, the dummy read can initiate state transition of the blocks and eliminate high RBER for blocks still in stable state.

Depending on the embodiment, during the power cycle event, the power cycle management component 113 identifies a first LBA read of a host read performed subsequent to the dummy read and starts a timer. The power cycle management component 113 determines if a page of the first LBA read fails and obtains a first data state metric (e.g., RBER) associated with the page failure. The power cycle management component 113 performs a second read of the page of the first LBA and obtains a second data state metric associated with the second read of the page. The power cycle management component 113 determines a change in data state metric between the first data state metric and the second data state metric. The power cycle management component 113 determines whether the change in data state metric exceeds a predetermined data state metric threshold.

Responsive to the change in data state metric exceeding the predetermined data state metric threshold, the power cycle management component 113 performs a re-read of the page. The predetermined data state metric threshold refers to a change in data state metric that indicates whether the page is in a stable state or a transient state. In particular, the change in data state metric between reads of a page when the block associated with the page is in stable state is much larger than the change in data state metric between reads of the page when the block associated with the page is in transient state. Accordingly, the predetermined data state metric threshold is a value larger than the largest change in data state metric a page may have when in transient state. In some embodiments, the predetermined data state metric threshold is an average change in data state metric a page may have when in transient state. In some embodiments, the power cycle management component 113 re-reads the page immediately or after a predetermined delay.

In order to prevent the page from indefinitely being re-read, the power cycle management component 113 determines whether a time since the timer was started (e.g., time passed) exceeds a predetermined time threshold. The predetermined time threshold refers to a period of time it takes from a page to transition for a page or block associated with the page to fully transition from stable state to transient state. Accordingly, the power cycle management component 113 continues to re-read the page until the time passed exceeds the predetermined time threshold indicating that the page is likely in transient state and requires REH operations. Thus, REH operations are avoided when the page or block is in state transition.

Responsive to the change in data state metric not exceeding the predetermined data state metric threshold, the power cycle management component 113 performs further REH operations to recover the page Further details with regards to the operations of the power cycle management component 113 are described below.

Figure 2:
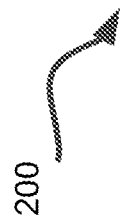
FIG. 2 illustrates an example of a table storing host read patterns for each power cycle event of the memory device for use in reducing read error handling operations during a subsequent powering up of the memory device, in accordance with some embodiments of the present disclosure.

FIG. 2 illustrates an example of a boot-up read pattern data structure (e.g., table) 200 that indicates whether a respective boot-up read pattern has been consecutively used during boot up, in accordance with some embodiments of the present disclosure. In one embodiment, the boot-up read pattern data structure is stored in local memory 119 of the memory sub-system 110.

The boot-up read pattern data structure 200 includes multiple rows identified by a power cycle event which refers to powering up of a memory sub-system subsequent to a power down of the memory sub-system (e.g., 210A-H). Each power cycle event 210A-H refers to an instance of a power cycle event experienced by the memory sub-system. For example, a first row of the boot-up read pattern data structure 200 (e.g., power cycle event 210A) represents a first instance of a power cycle event (e.g., a first power cycle event) experienced by the memory sub-system, a second row of the boot-up read pattern data structure 200 (e.g., power cycle event 210B) represents a second instance of a power cycle event (e.g., a second power cycle event) experienced by the memory sub-system, and so on.

Each entry of the boot-up read pattern data structure 200 identified by a respective power cycle event 210 includes a boot-up read pattern 220 and a dummy boot-up pattern flag (e.g., 230A-H). The boot-up read pattern 220 of the respective power cycle event 210 includes a plurality of logical block addresses (LBAs) read by the host during the respective power cycle event. A first portion of the plurality of logical block addresses is associated with loading an operating system (OS) (e.g., OS LBA). A second portion of the plurality of logical block addresses is associated with loading applications within the OS (e.g., APP LBA).

The dummy boot-up pattern flag (e.g., 230C) of a corresponding power cycle event (e.g., 210C) is a bit flag indicating whether or not the boot-up read pattern 220 of the corresponding power cycle event (e.g., 210C) has been consecutively used. The bit flag can be set to a first logical state (e.g., to the logical "1") to indicate that the boot-up read pattern 220 of the corresponding power cycle event has been consecutively used and the bit flag can be set to a second logical state (e.g., to the logical "0") (or reset) to indicate that the boot-up read pattern 220 of the corresponding power cycle event has been consecutively used. The boot-up read pattern 220 of the corresponding power cycle event has been consecutively used if the boot-up read pattern 220 of the corresponding power cycle event (e.g., 210C) matches the boot-up read pattern 220 of a previous power cycle event (e.g., 210B).

FIG. 3 is a flow diagram of an example method 300 of updating a read pattern used for a dummy read during power up of a memory device, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the power cycle management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic maintains a boot-up read pattern data structure. In one embodiment, each entry of the boot-up read pattern data structure, such as boot-up read pattern data structure 200, includes a boot-up read pattern associated with a respective power cycle event and a dummy boot-up read pattern flag. When set, the dummy boot-up read pattern flag indicates that the boot-up read pattern has been consecutively used during boot up. In some embodiments, each entry of the boot-up read pattern data structure may be indexed by the respective power cycle event.

At operation 320, for each power cycle event, the processing logic stores, in a new entry of the boot-up read pattern data structure, a current boot-up read pattern associated with a respective power cycle event. More specifically, during the respective power cycle event the host performs a read to load an operating system and applications of the host system. The host read may be a boot-up read pattern necessary to load the operating system and applications of the host system (e.g., the current boot-up read pattern). The power cycle event may include powering up of a memory sub-system subsequent to a power down of the memory sub-system.

At operation 330, the processing logic compares the current boot-up read pattern with a previous boot-up read pattern associated with a latest entry of the boot-up pattern data structure. To compare the current boot-up read pattern with the previous boot-up read pattern, the processing logic compares a subset of the current boot-up read pattern associated with loading (or booting up) an operating system (OS) with a subset of the previous boot-up read pattern associated with booting up the OS.

At operation 340, responsive to the comparing the current boot-up read pattern and the previous boot-up read pattern, the processing logic updates a dummy boot-up read pattern flag of the new entry. As previously described, once it is determined that the current boot-up read pattern matches the previous boot-up read pattern, the processing logic updates the dummy boot-up read pattern flag of the new entry by setting the dummy boot-up read pattern flag of the new entry indicating that the current boot-up read pattern has been consecutively used during boot up responsive to the current boot-up read pattern matching the previous read pattern. Otherwise, once it is determined that the current boot-up read pattern does not match the previous boot-up read pattern, the processing logic updates the dummy boot-up read pattern flag of the new entry by resetting the dummy boot-up read pattern flag of the new entry indicating that the current boot-up read pattern has not been consecutively used during boot up responsive to the current boot-up read pattern not matching the previous read pattern.

In some embodiment, at operation 350, responsive to a power cycle event, the processing logic performs a dummy read using a boot-up read pattern associated with a latest entry of the boot-up read pattern data structure. The dummy read may be performed prior to performing a read using a boot-up read pattern associated with the power cycle event.

In some embodiments, responsive to a power cycle event, the processing logic identifies a latest entry of the boot-up read pattern data structure with a set dummy boot-up read pattern flag indicating that the boot-up read pattern has been consecutively used during boot up. Then, the processing logic performs a dummy read using a boot-up read pattern associated with the latest entry of the boot-up read pattern data structure with the dummy boot-up read pattern flag indicating that the boot-up read pattern has been consecutively used during boot up. The dummy read may be performed prior to performing a read using a boot-up read pattern associated with the power cycle event.

Figure 4:
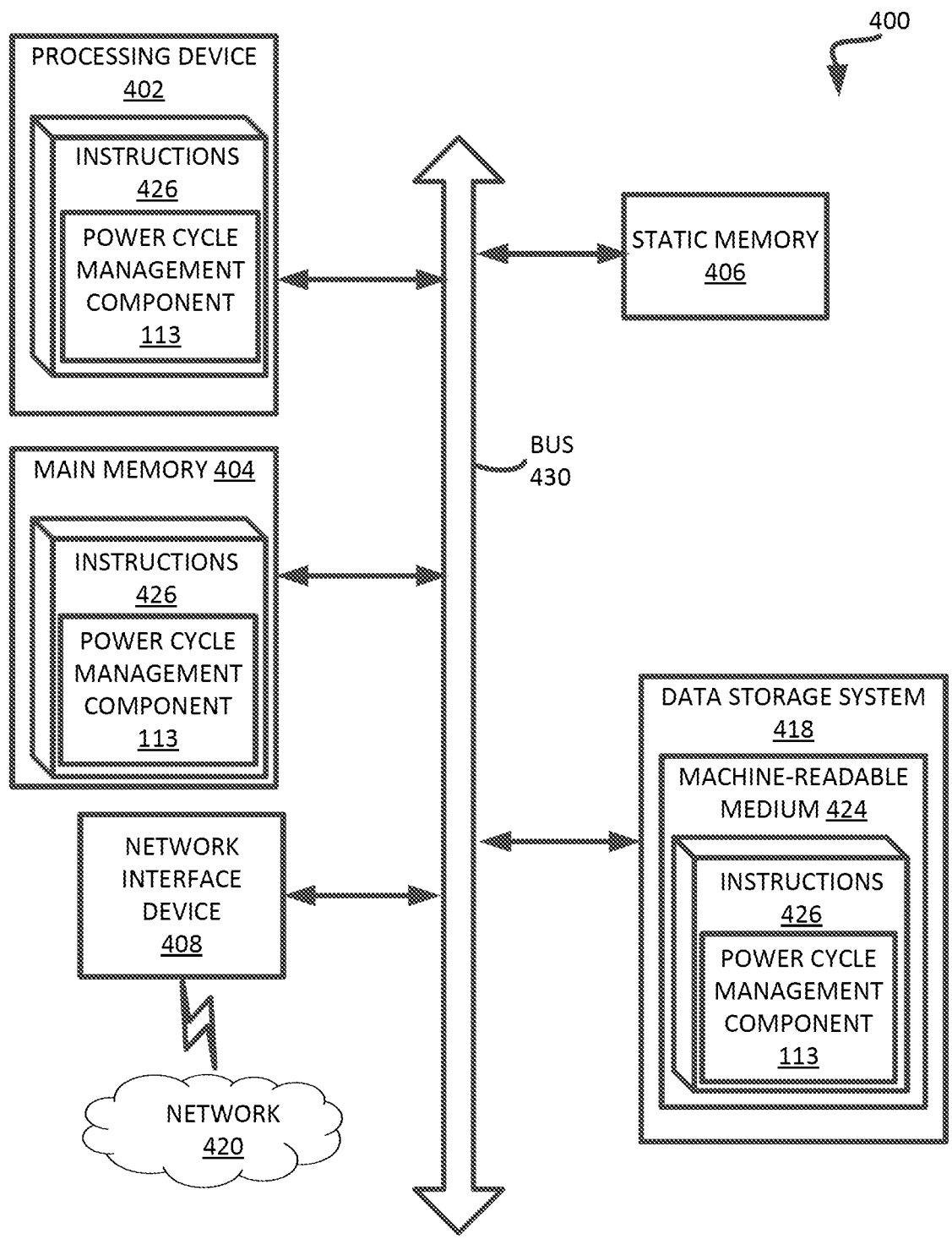
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the power cycle management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or RDRAM, etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a power cycle management component (e.g., the power cycle management component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
maintaining a boot-up read pattern data structure, wherein each entry of the boot-up read pattern data structure comprises a boot-up read pattern represented as a plurality of logical block addresses (LBAs) that were read during a respective power cycle event and a dummy boot-up read pattern flag;
for each power cycle event, storing, in a new entry of the boot-up read pattern data structure, a current boot-up read pattern associated with a respective power cycle event;
comparing the current boot-up read pattern with a previous boot-up read pattern associated with a latest entry of the boot-up pattern data structure; and
responsive to the comparing the current boot-up read pattern and the previous boot-up read pattern, updating a dummy boot-up read pattern flag of the new entry, wherein the dummy boot-up read pattern flag indicates that the current boot-up read pattern and the previous boot-up pattern are the same boot-up pattern that has been consecutively used during boot up.

2. The method of claim 1, wherein updating the dummy boot-up read pattern flag of the new entry of the boot-up read pattern data structure comprises responsive to the current boot-up read pattern matching the previous read pattern, setting the dummy boot-up read pattern flag of the new entry indicating that the current boot-up read pattern has been consecutively used during boot up.

3. The method of claim 1, wherein updating the dummy boot-up read pattern flag of the new entry of the boot-up read pattern data structure comprises responsive to the current boot-up read pattern not matching the previous read pattern, resetting the dummy boot-up read pattern flag of the new entry indicating that the current boot-up read pattern has not been consecutively used during boot up.

4. The method of claim 1, further comprising:
responsive to a power cycle event, performing a dummy read using a boot-up read pattern associated with a latest entry of the boot-up read pattern data structure, wherein the dummy read is performed prior to performing a read using a boot-up read pattern associated with the power cycle event.

5. The method of claim 1, further comprising:
responsive to a power cycle event, identifying a latest entry of the boot-up read pattern data structure with a set dummy boot-up read pattern flag indicating that the boot-up read pattern has been consecutively used during boot up; and
performing a dummy read using a boot-up read pattern associated with the latest entry of the boot-up read pattern data structure with the dummy boot-up read pattern flag indicating that the boot-up read pattern has been consecutively used during boot up, wherein the dummy read is performed prior to performing a read using a boot-up read pattern associated with the power cycle event.

6. The method of claim 1, wherein comparing the current boot-up read pattern with the previous boot-up read pattern comprises comparing a subset of the current boot-up read pattern associated with booting up an operating system (OS) with a subset of the previous boot-up read pattern associated with booting up the OS.

7. The method of claim 1, wherein the power cycle event includes powering up of a memory sub-system subsequent to a power down of the memory sub-system.

8. The method of claim 1, wherein each entry of the boot-up read pattern data structure is indexed by a power cycle count.

9. The method of claim 5, further comprising:
performing a read operation from a plurality of logical block addresses (LBAs) to boot up an operating system and corresponding applications;
responsive to a first unsuccessful read of a first LBA of the plurality of LBAs, identifying a first raw bit error rate (RBER) associated with the first unsuccessful read; and
for each subsequent read of the first LBA, determining whether a difference between the first RBER and an RBER of the subsequent read satisfies a first threshold criterion.

10. The method of claim 9, further comprising:
responsive to satisfying the first threshold criterion, performing a subsequent read on the first LBA.

11. The method of claim 9, further comprising:
responsive to satisfying the first threshold criterion, performing an error handling operation on the first LBA.

12. The method of claim 9, wherein the first threshold criterion is satisfied if the difference between the first RBER and an RBER of the subsequent read exceeds a RBER change threshold value.

13. The method of claim 10, wherein performing the subsequent read on the first LBA comprises performing the subsequent read on the first LBA when a period of time since a first page of the first LBA was read satisfies a second threshold criterion, wherein the second threshold criterion is satisfied if the period of time since the first page of the first LBA was read does not exceed a transition time threshold value.

14. A system comprising:
a memory device; and
a processing device, operatively coupled to the memory device, the processing device to perform operations comprising:
maintaining a boot-up read pattern data structure, wherein each entry of the boot-up read pattern data structure comprises a boot-up read pattern represented as a plurality of logical block addresses (LBAs) that were read during a respective power cycle event and a dummy boot-up read pattern flag;
for each power cycle event, storing, in a new entry of the boot-up read pattern data structure, a current boot-up read pattern associated with a respective power cycle event;
comparing the current boot-up read pattern with a previous boot-up read pattern associated with a latest entry of the boot-up pattern data structure;
responsive to the comparing the current boot-up read pattern and the previous boot-up read pattern, updating a dummy boot-up read pattern flag of the new entry, wherein the dummy boot-up read pattern flag indicates that the current boot-up read pattern and the previous boot-up pattern are the same boot-up pattern that has been consecutively used during boot up; and
responsive to a power cycle event, performing a dummy read using a boot-up read pattern associated with a latest entry of the boot-up read pattern data structure, wherein the dummy read is performed prior to performing a read using a boot-up read pattern associated with the power cycle event.

15. The system of claim 14, wherein updating the dummy boot-up read pattern flag of the new entry of the boot-up read pattern data structure comprises responsive to the current boot-up read pattern matching the previous read pattern, setting the dummy boot-up read pattern flag of the new entry indicating that the current boot-up read pattern has been consecutively used during boot up.

16. The system of claim 14, wherein updating the dummy boot-up read pattern flag of the new entry of the boot-up read pattern data structure comprises responsive to the current boot-up read pattern not matching the previous read pattern, resetting the dummy boot-up read pattern flag of the new entry indicating that the current boot-up read pattern has not been consecutively used during boot up.

17. The system of claim 14, wherein comparing the current boot-up read pattern with the previous boot-up read pattern comprises comparing a subset of the current boot-up read pattern associated with booting up an operating system (OS) with a subset of the previous boot-up read pattern associated with booting up the OS.

18. A non-transitory computer readable storage medium including instructions that, when executed by a processing device, cause the processing device to perform a method comprising:
maintaining a boot-up read pattern data structure, wherein each entry of the boot-up read pattern data structure comprises a boot-up read pattern represented as a plurality of logical block addresses (LBAs) that were read during a respective power cycle event and a dummy boot-up read pattern flag;
for each power cycle event, storing, in a new entry of the boot-up read pattern data structure, a current boot-up read pattern associated with a respective power cycle event;
comparing the current boot-up read pattern with a previous boot-up read pattern associated with a latest entry of the boot-up pattern data structure;
responsive to the comparing the current boot-up read pattern and the previous boot-up read pattern, updating a dummy boot-up read pattern flag of the new entry, wherein the dummy boot-up read pattern flag indicates that the current boot-up read pattern and the previous boot-up pattern are the same boot-up pattern that has been consecutively used during boot up; and
responsive to a power cycle event, performing a dummy read using a boot-up read pattern associated with a latest entry of the boot-up read pattern data structure, wherein the dummy read is performed prior to performing a read using a boot-up read pattern associated with the power cycle event.

19. The non-transitory computer readable storage medium of claim 18, causes the processing device to perform a method further comprising:
performing a read operation from a plurality of logical block addresses (LBAs) to boot up an operating system and corresponding applications;
responsive to performing a read on a first LBA of the plurality of LBAs, initiate a timer;
responsive to a first unsuccessful read of the first LBA of the plurality of LBAs, identifying a first raw bit error rate (RBER) associated with the first unsuccessful read; and
for each subsequent read of the first LBA, determining whether a difference between the first RBER and an RBER of the subsequent read satisfies a first threshold criterion and an amount of time since the timer was initiated satisfies a second threshold criterion.

20. The non-transitory computer readable storage medium of claim 19, wherein the first threshold criterion is satisfied if the difference between the first RBER and an RBER of the subsequent read exceeds a RBER change threshold value, and wherein the second threshold criterion is satisfied if the amount of time since the timer was initiated does not exceed a transition time threshold value.

* * * * *